US006323445B1

(12) United States Patent
Yee

(10) Patent No.: US 6,323,445 B1
(45) Date of Patent: Nov. 27, 2001

(54) MEMBRANE SWITCH STRUCTURE PROVIDING ELECTROSTATIC DISCHARGE PROTECTION

(75) Inventor: Dawson Yee, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/561,215

(22) Filed: Apr. 28, 2000

(51) Int. Cl.[7] .............................. H02H 9/02; H05F 3/00

(52) U.S. Cl. ......................... 200/5 A; 200/305; 361/212; 361/220

(58) Field of Search ........................... 200/5 A, 512–517, 200/304, 305; 174/250–264; 361/212–220; 341/22–35

(56) References Cited

U.S. PATENT DOCUMENTS

| | | | | |
|---|---|---|---|---|
| 3,786,497 | | 1/1974 | Davis et al. | 341/24 |
| 4,222,038 | | 9/1980 | Magerl | 341/26 |
| 4,303,960 | * | 12/1981 | Sherwood et al. | 361/212 |
| 4,454,800 | * | 6/1984 | Holland | 200/5 A |
| 4,667,181 | | 5/1987 | Hastreiter | 341/26 |
| 4,739,310 | | 4/1988 | Yamamoto | 341/25 |
| 4,786,767 | * | 11/1988 | Kuhlman | 200/5 A |
| 5,748,114 | | 5/1998 | Koehn | 341/22 |
| 5,877,709 | | 3/1999 | Ala-Lehtimäki et al. | 341/26 |
| 6,072,126 | * | 6/2000 | Shiga et al. | 174/250 |

* cited by examiner

*Primary Examiner*—J. R. Scott
(74) *Attorney, Agent, or Firm*—Banner & Witcoff, Ltd.

(57) ABSTRACT

A membrane switch structure providing electrostatic discharge (ESD) protection has three layers of insulating material, including two outer layers containing on their inside opposing surfaces printed conductive circuit patterns which may be selectively brought into electrical contact with each other through contact apertures provided in an intermediate insulting layer. An ESD protection circuit is provided in close proximity to at least one of the two outer layers, e.g., by printing the pattern on a backside of one of the outer layers in the same manner that printing of the circuit pattern is carried out. The ESD protection circuit pattern replicates, at least generally, all or a portion of the layout of the conductive circuit patterns. The ESD protection circuit can be efficiently fabricated and offers effective protection of the membrane switches from ESD events that can cause device operation problems in, for example, computer keyboards.

15 Claims, 7 Drawing Sheets

MEMBRANE SWITCH STRUCTURE PROVIDING ELECTROSTATIC DISCHARGE PROTECTION

TECHNICAL FIELD

This invention relates generally to membrane switches. More particularly, the invention concerns arrangements for protecting systems or subsystems that use membrane switches from electrostatic discharge.

BACKGROUND OF THE INVENTION

A membrane switch is a momentary switch device having at least one contact that is provided on or made of a flexible substrate. Membrane switches are commonly used in computer keyboards and myriad other applications. In a conventional membrane switch arrangement, three layers of thin polyester (e.g., Mylar™) sheets are sandwiched together. Membrane switches may be constructed with a rigid layer, e.g., a layer of glass, plastic, or printed circuit board material, as used in a touch panel membrane switch, touchpad or keypad. The outer two layers each carry on their opposing inside surfaces conductive switch circuit patterns. An intermediate layer is disposed between the outer two layers and acts to isolate the switch circuit patterns from each other. The switch circuit patterns may, however, be selectively brought into electrical contact with each other through contact apertures provided in the intermediate layer. When selective contact is made between the opposing switch circuit patterns, an electrical circuit may be completed to perform a predetermined action.

Referring to FIG. 1, a conventional computer keyboard 100 may utilize a conventional membrane switch structure 200, as shown in FIG. 2, which is installed underneath a set of keyboard keys 101, to convert key selections into electrical signals representing corresponding alphanumeric characters or functions. Membrane switch structure 200 generally has three layers 201, 202 and 203. Outer layers 201 and 202 sandwich intermediate layer 203. The three layers are generally made out of a thin insulative sheet, for example, polyester, glass, plastic or even common printed circuit board material. Outer layers 201 and 202 each have, on respective opposing inside surfaces 210 and 211, switch circuit patterns (208 and 209, respectively), which may be deposited by print transfer (e.g., silk screening), spraying or other techniques. The circuit patterns may be printed with suitable conductive inks, e.g., a polymer-based conductive ink having silver, carbon, and/or other conductive particles in suspension. Typically, each keyboard key is coupled to a flexible plunger positioned to make contact with a backside of an upper one of the two outer layers of the membrane switch. Depression of a selected keyboard key 101 causes a corresponding plunger to exert pressure on the upper outer layer of the membrane switch. The resulting pressure causes an electrical circuit printed on the inner face of the top outer layer to come resiliently into electrical contact with a corresponding circuit printed on the inner face of the bottom outer layer of the membrane switch, through contact apertures provided in the intermediate layer. The electrical contact results in generation of a signal input to an integrated circuit (IC) located within the keyboard. The IC, in turn, provides a digital output signal readable by the associated computer.

Circuit patterns 208 and 209 are appropriately laid out to provide contact points and lines of conduction for each of keyboard keys 101 within a conventional switch matrix. Thus, e.g., by key depression at location 212, upper membrane switch circuit 208 may be brought into electrical contact with the lower membrane switch circuit 209, through contact aperture 204 in intermediate layer 203. The electrical contact between the designated contact points of opposing circuits 208 and 209 results in generation of an electrical signal (high or low voltage) on a particular line of the keyboard switch matrix. By recognizing the line on which the signal is generated, and the timing thereof, the keyboard mounted IC can discriminate which of keyboard keys 101 has been depressed.

Membrane switch circuitry tends to be susceptible to disturbance by electrostatic discharge (ESD). ESD events can induce noise voltages and currents on the circuits of the membrane switch resulting in device operation problems. Various schemes are known which serve to reduce the ESD susceptibility of membrane switches. Most conventionally, a metal grounding plate may be positioned under an entire switch circuit pattern for providing ESD protection. Although a metal grounding plate can shield the associated switch circuitry from ESD events, use of a metal grounding plate can significantly increase keyboard fabrication costs and product weight. A second known approach involves use of an insulative sheet with a layer of continuous conductive material printed thereon. The printed sheet emulates the presence of the metal grounding plate at a lower cost. While a continuous layer of conductive material on an insulating sheet is less expensive than a metal grounding plate, there is significant cost associated with the conductive ink required to produce the continuous conductive layer. Another known approach is to print on an insulating sheet a rectilinear conductive grid pattern 301 (see FIG. 3), or a concentric circle grid pattern 401 (see FIG. 4). Using these types of grid patterns can reduce the costs associated with a continuous layer of conductive ink. However, depending on the spacing and location of the gridlines relative to the lines of the switch circuit patterns, the grid patterns do not necessarily ensure that all lines of the switch circuit patterns are adequately protected from ESD. Increased ESD protection can be achieved by increasing the density of the grid lines, but only at a higher cost approaching the cost of a continuous conductive layer.

It would be desirable to have a membrane switch configuration providing optimized ESD protection at reduced costs.

SUMMARY OF THE INVENTION

In a first aspect, the invention provides a layer for use in a membrane switch. The layer has opposing first and second surfaces. A membrane switch circuit pattern is provided on the first surface, and an ESD protection circuit pattern is provided on the second surface. The protection circuit pattern includes a portion at least generally replicating at least a portion of the membrane switch circuit pattern.

In a second aspect, the invention provides a membrane switch having a first outer layer of insulating material having on its inside surface a first switch circuit pattern, and a second outer layer of insulating material having on its inside surface a second switch circuit pattern. The membrane switch firther has an intermediate insulating layer disposed between the first and second outer layers. The intermediate layer has contact apertures for selectively permitting electrical contact portions of the first and second switch circuit patterns to be brought into electrical contact with each other. An ESD protection circuit is laid down in close proximity to the first and second outer layers. At least a portion of the ESD protection circuit at least generally replicates at least a portion of a composite layout of the first and second circuit patterns.

In a third aspect, the invention provides an ESD protected keyboard having a plurality of keyboard keys and a membrane switch structure associated with the plurality of keyboard keys. The membrane switch comprises a membrane switch circuit pattern defining a key switch matrix and an ESD protection circuit pattern. At least a portion of the ESD protection circuit pattern at least generally replicates at least a portion of a layout of the membrane switch circuit pattern.

By tracking the underlying switch circuit patterns, more effective and efficient use is made of the applied conductive material, as compared to a metal grounding plate, or a printed conductive layer or grid. Advantageously, switch circuit pattern replicating ESD patterns in accordance with the present invention may be applied by silk-screen printing in the same manner as are the switch circuit patterns themselves. The advantages of ESD protection circuit patterns in accordance with the present invention can be realized in computer keyboards and myriad other membrane switch applications.

The above and other features and advantages of the present invention will be readily apparent and fully understood from the following detailed description of preferred embodiments, taken in connection with the appended drawings.

DETAILED DESCRIPTION OF THE INVENTION

Figure 1:
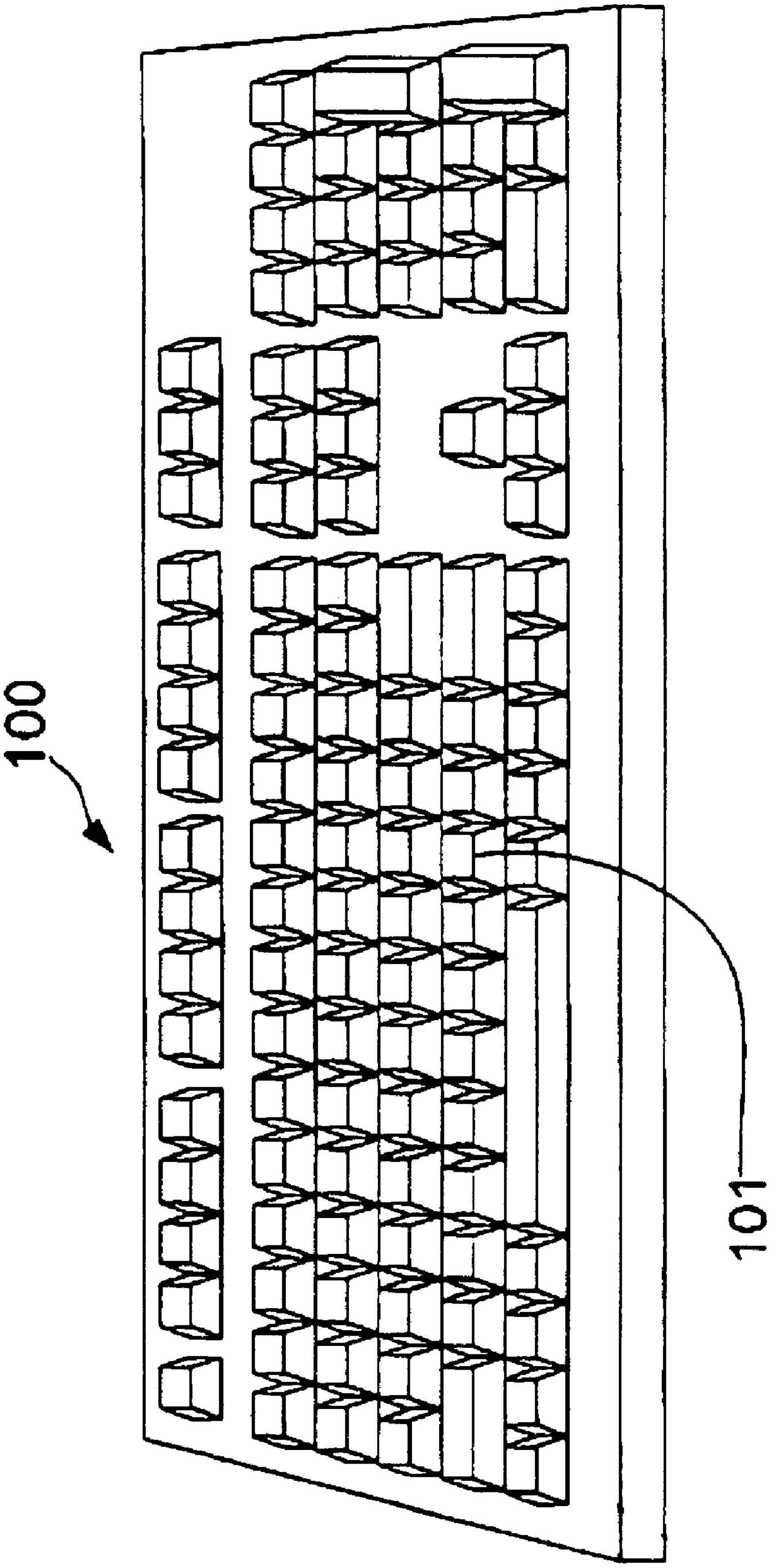
FIG. 1 (PRIOR ART)
FIG. 1 is a diagrammatic perspective view of a conventional computer keyboard.
Figure 2:
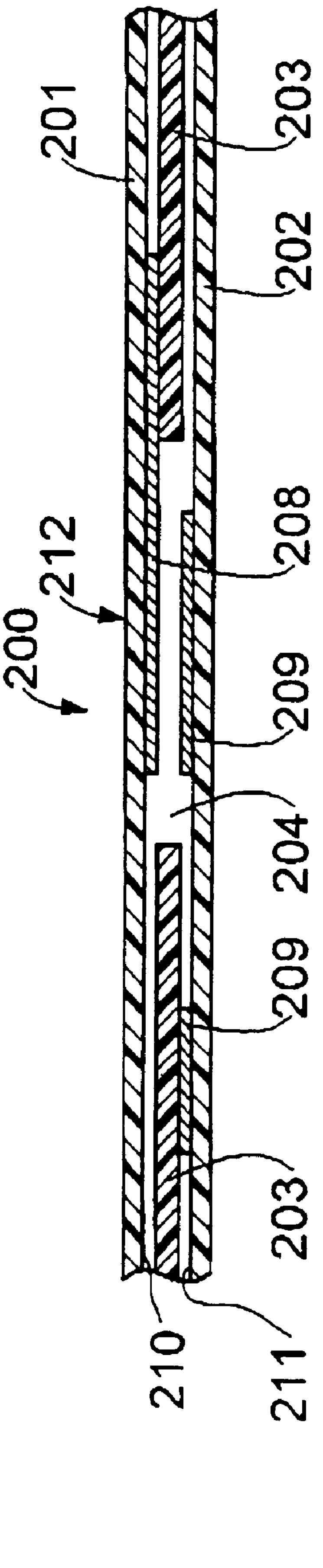
FIG. 2 (PRIOR ART)
FIG. 2 is a diagrammatic partial cross-sectional view of a conventional three-layer membrane switch structure.
Figure 3:
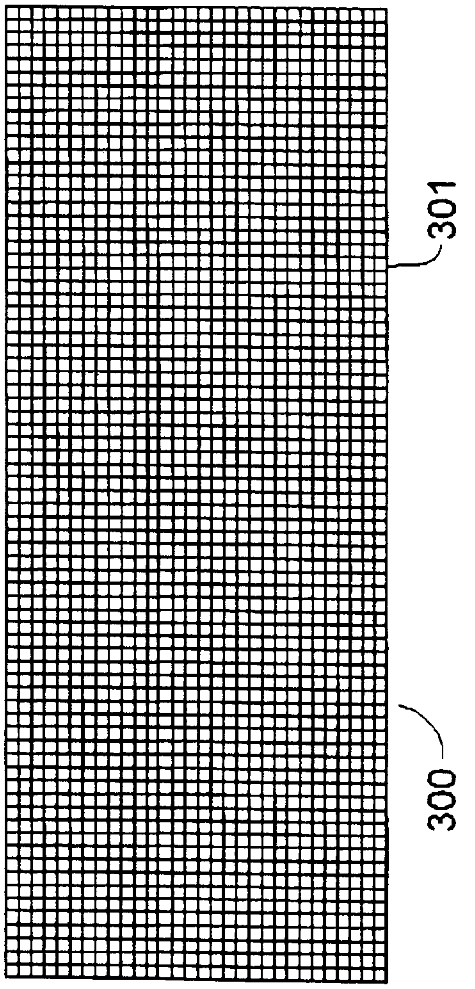
FIG. 3 (PRIOR ART)
FIG. 3 is a plan view showing a membrane switch layer including a known type of rectilinear grid pattern for providing ESD protection.
Figure 4:
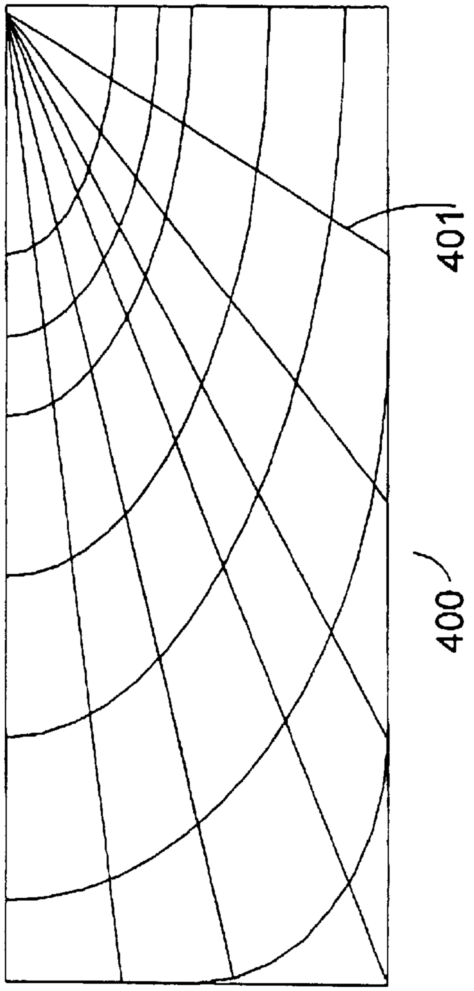
FIG. 4 (PRIOR ART)
FIG. 4 is a plan view showing a membrane switch layer including a known type of concentric circle grid pattern for providing ESD protection.
Figure 5A:
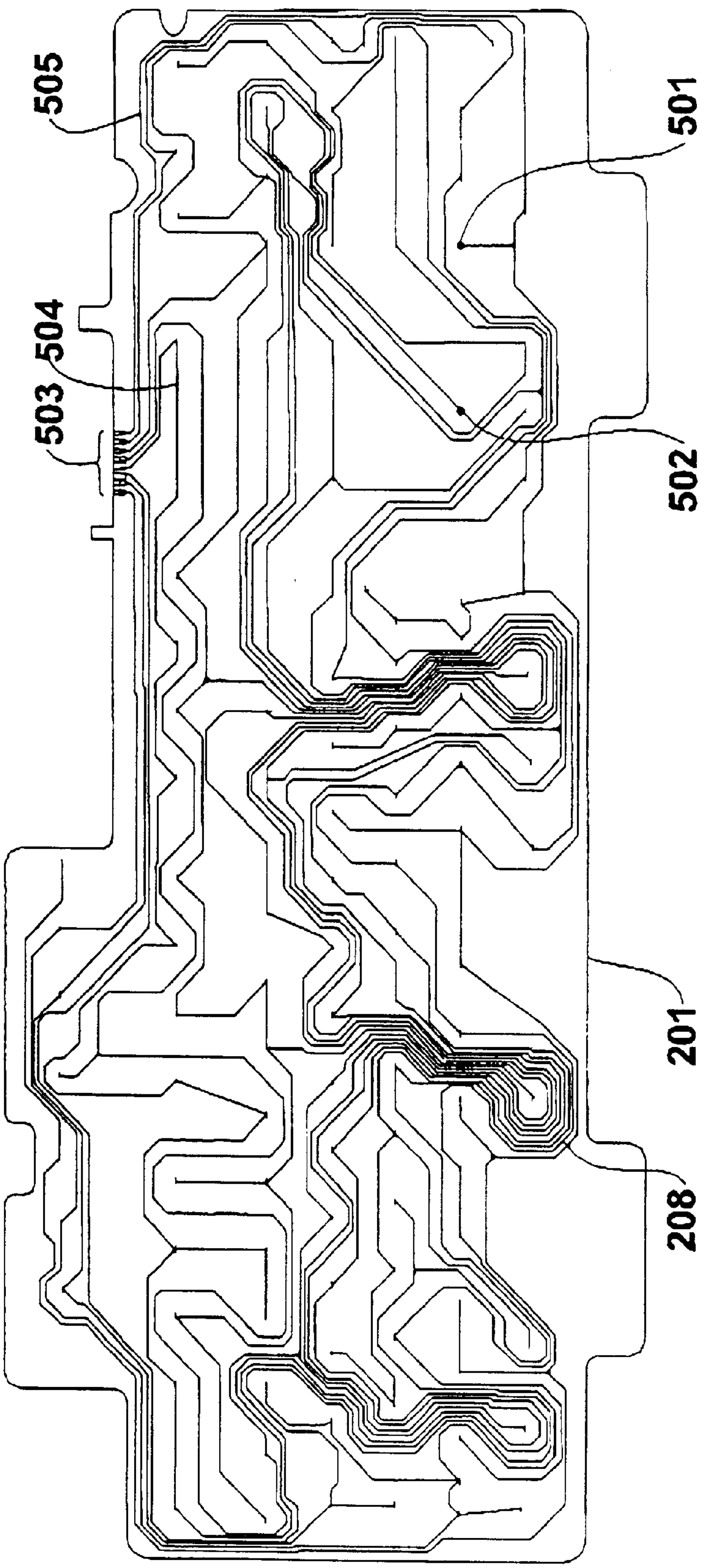
FIG. 5A is a plan view of an exemplary membrane switch circuit pattern provided on a first outer layer of a membrane switch structure in accordance with the invention.
Figure 5B:
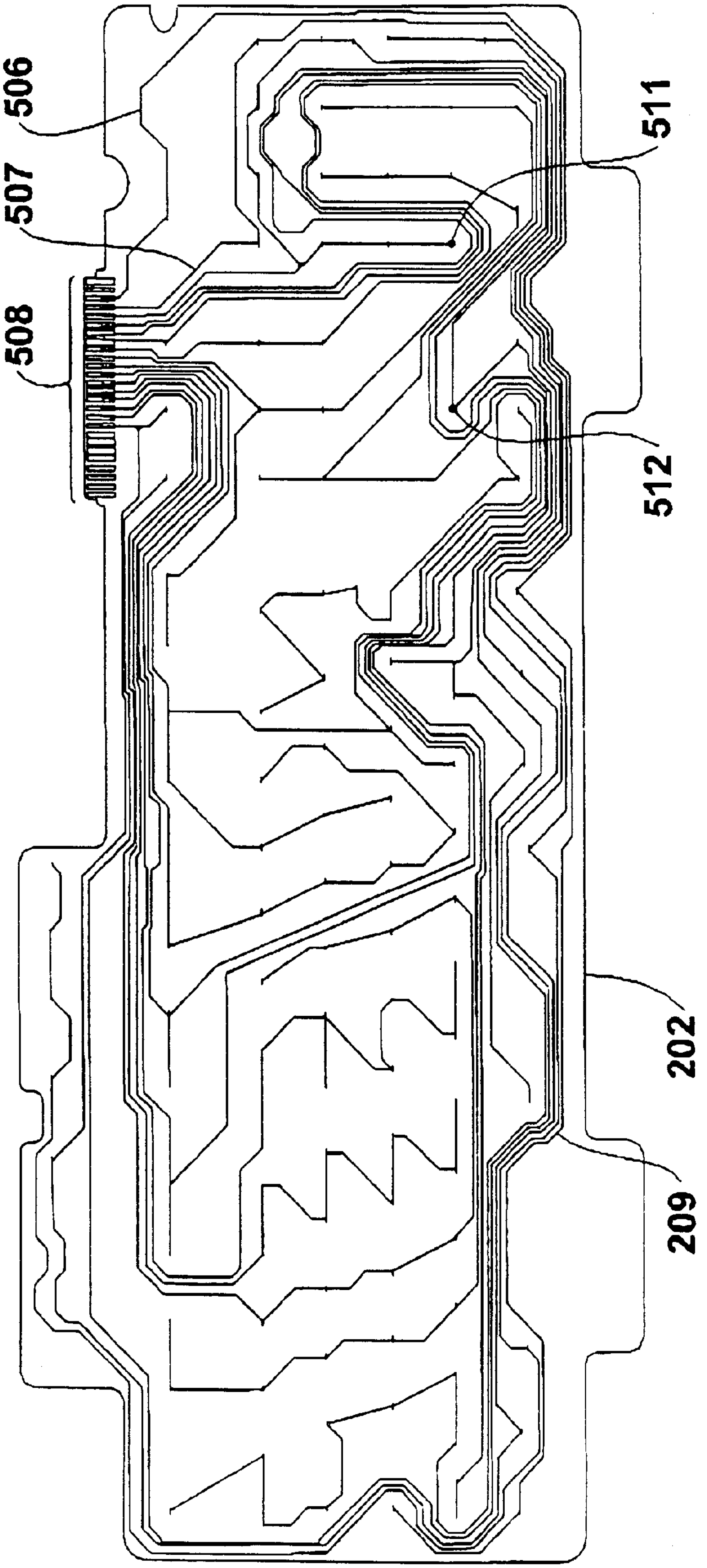
FIG. 5B is a plan view of an exemplary membrane switch circuit pattern provided on a second outer layer of a membrane switch structure, for making selective mating contact with the switch circuit pattern of FIG. 5A.

In accordance with the invention, a membrane switch structure may be protected against ESD by an ESD protection circuit replicating at least a portion or sector of a composite circuit pattern layout formed by a pair of membrane switch circuit patterns overlaying each other. Referring to FIGS. 5A and 5B, upper and lower membrane switch layers 201, 202, carrying switch circuit patterns 208, 209, are respectively shown. Switch circuit pattern 208 is printed on an inside surface 210 of top membrane switch layer 201, and includes exemplary sense (or drive) lines 504, 505, as well as exemplary contact points 501, 502 corresponding to keyboard key positions. Switch circuit pattern 208 further includes terminals 503 used to connect the switch circuitry to a keyboard mounted IC. Switch circuit pattern 209 includes exemplary drive (or sense) lines 506, 507, as well as exemplary contact points 511, 512. Switch circuit pattern 209 also includes terminal contacts 508 for appropriate connection to the keyboard mounted IC. The IC drives drive lines of the switch matrix in a cyclical fashion, and receives voltage signals on associated sense lines of the switch matrix. Together, switch circuit patterns 208, 209 comprise a keyboard switch circuit matrix enabling keyboard key discrimination by the IC.

Figure 6:
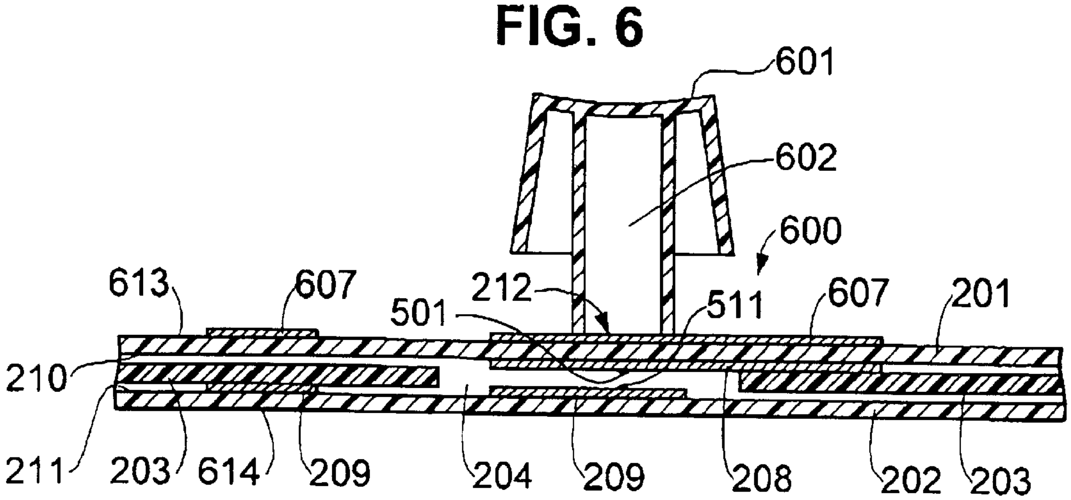
FIG. 6 is a diagrammatic partial cross-sectional view of an exemplary three-layer membrane switch structure in accordance with the present invention.

Referring next to FIG. 6, a membrane switch 600 in accordance with the present invention incorporates an ESD protection circuit pattern 607 printed on a backside 613 of upper outer switch layer 201. Circuit pattern 607 is connected to a common ground of the keyboard/computer. Membrane switch 600 is shown having circuit patterns 208, 209 laid out on the inside surfaces 210, 211 of outer layers 201, 202, respectively. An exemplary keyboard key 601 is coupled to membrane switch 600 at location 212. A depression of keyboard key 601, along with plunger 602, exerts pressure on flexible outer layer 201 at location 212. The pressure causes a momentary electrical contact between contact point 501 located on the inside face of top outer layer 201 and contact point 511 located on the inside face of bottom outer layer 202. The momentary electrical contact results in a momentary completion of an electrical circuit of the switch matrix created by the switch circuit patterns 208 and 209, resulting in generation of a signal on a particular sense line at a particular time (relative to a clock pulse) which is input to the keyboard mounted IC for keyboard key discrimination.

In accordance with the present invention, ESD protection circuit 607 is laid down in close proximity to switch circuit patterns 208 and 209. Preferably, ESD protection circuit 607 is printed on a backside 613 of the top outer layer 201 of the membrane switch 600, as shown in FIG. 6. Alternatively, ESD protection circuit 607 may be printed on a backside 614 of lower outer layer 202. Advantageously, ESD protection circuit pattern 607 can be printed on the membrane switch 600 layers using the same silk-screening process used to print circuit patterns 208, 209. In alternative embodiments of the present invention, ESD protection circuit 607 may be printed on an additional (fourth) sheet of polyester laid in direct contact with, or close proximity to, one of the outer layers of the membrane switch 600.

Figure 7:
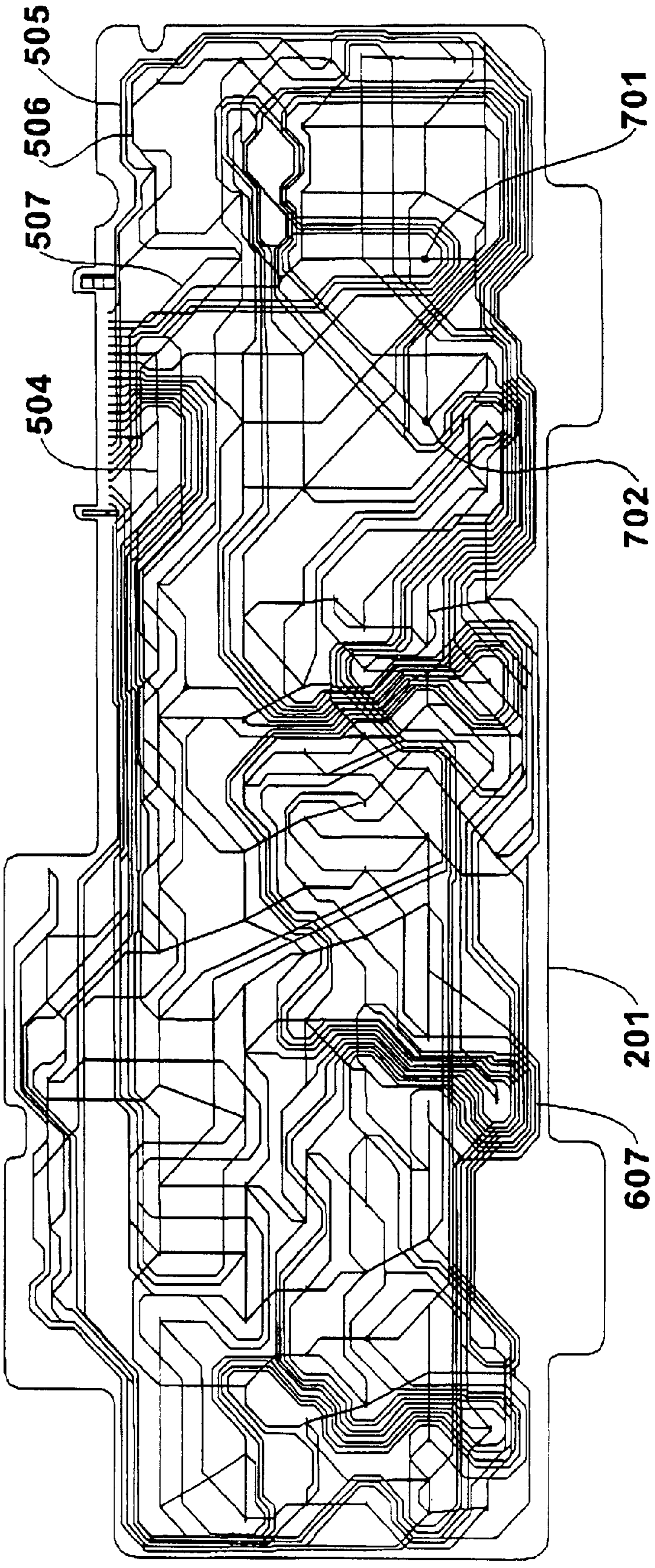
FIG. 7 is a plan view of an exemplary outer membrane switch layer including, on its outer side, a printed ESD protection circuit pattern representing a composite of the circuit pattern layouts shown in FIGS. 5A and 5B.

Referring now to FIG. 7, the backside 613 of membrane switch outer layer 201 is clearly shown. It can be seen that ESD protection circuit pattern 607 represents a composite of the switch circuit pattern layouts of circuits 208 and 209. In the illustrated preferred embodiment of the present invention, ESD protection circuit 607 replicates, in its entirety, the composite layout formed by switch circuit patterns 208, 209 (which are overlaid upon each other). For example, ESD protection circuit 607 includes circuit lines 504, 505 of switch circuit pattern 208 printed on the top outer layer 201, and circuit lines 506, 507 of switch circuit pattern 209 printed on the bottom outer layer 202. ESD protection circuit 607 further preferably includes circular areas corresponding to respective contact points provided in the switch circuits, e.g., circular contact areas 701 and 702. Area 701 corresponds in location to mating contacts 501 and 511, while circular area 702 corresponds in location to mating contacts 502 and 512.

While the above-described arrangement is preferred, advantages can be achieved, albeit to a lesser extent, if ESD protection circuit 607 replicates only a portion or sector of the associated switch circuit patterns 208 and/or 209. Preferably, the width and configuration of individual lines of ESD protection circuit 607 substantially duplicate the width and configuration of corresponding circuit lines of the switch circuits. In alternative embodiments of the present invention, however, it may be possible to further reduce the amount of conductive ink required to form ESD protection circuit 607, by providing the conductive lines thereof as variations on the circuit lines, e.g., thinner lines, broken lines, etc. As a further variation, a first ESD protection circuit replicating all or a portion of switch circuit pattern 208 may be printed on the backside of outer layer 201, while a second ESD protection circuit replicating all or a portion of switch circuit pattern 209 may be printed on the backside of outer layer 202.

Operationally, unlike prior art methods, the present invention does not seek to emulate a metal grounding plate by blocking ESD induced noise. Instead, the effectiveness of protection circuit pattern 607 is believed to result from a cancellation of ESD induced noise voltages and/or currents. Specifically, it is believed that electromagnetic fields induce equal noise voltages (and currents) on both the membrane switch circuit patterns and the protection circuit pattern, with the net result that the device electronics perform a cancellation of the common mode noise voltages. The noise voltages are common mode since any electromagnetic fields intersect the switch circuit and ESD protection circuit patterns identically, and also the switch circuit and ESD protection circuit patterns are maximally capacitively coupled.

The present invention has been described in terms of preferred and exemplary embodiments thereof. Numerous other embodiments, modifications and variations within the scope and spirit of the appended claims will occur to persons of ordinary skill in the art from a review of this disclosure.

What is claimed is:

1. A layer for use in a membrane switch, the layer comprising:

opposing first and second surfaces;

a membrane switch circuit pattern provided on the first surface; and an ESD protection circuit pattern provided on the second surface, wherein the protection circuit pattern includes a portion, comprising a plurality of protection circuit lines, having a layout at least generally replicating, and at least generally in registry with, a layout of a plurality of switch circuit lines of at least a portion of the membrane switch circuit pattern.

2. The layer of claim 1, wherein the ESD protection circuit pattern at least generally replicates substantially the entire membrane switch circuit pattern.

3. The layer of claim 1, wherein the membrane switch circuit pattern and the ESD protection circuit pattern comprise respective printed conductive patterns.

4. The layer of claim 1, wherein the layer comprises a polyester sheet.

5. A membrane switch comprising:

a first outer layer of insulating material having on its inside surface a first switch circuit pattern;

a second outer layer of insulating material having on its inside surface a second switch circuit pattern;

an intermediate insulating layer disposed between the first and second outer layers, the intermediate layer having contact apertures for selectively permitting electrical contact portions of the first and second switch circuit patterns to be brought into electrical contact with each other; and an ESD protection circuit laid down in close proximity to the first and second outer layers, wherein at least a portion of the ESD protection circuit, comprising a plurality of protection circuit lines, has a layout at least generally replicating, and at least generally in registry with, a layout of a plurality of switch circuit lines of at least a portion of a composite layout of the first and second switch circuit patterns.

6. The membrane switch of claim 5, wherein the layout of the ESD protection circuit pattern at least generally replicates substantially the entire composite layout of the first and second circuit patterns.

7. The membrane switch of claim 5, wherein the first outer layer of insulating material comprises a polyester sheet.

8. The membrane switch of claim 7, wherein the second outer layer of insulating material comprises a polyester sheet.

9. The membrane switch of claim 8, wherein the intermediate insulating layer comprises a polyester sheet.

10. The membrane switch of claim 5, wherein at least a portion of the ESD protection circuit pattern is printed on a backside of one of the first and second outer layers.

11. The membrane switch of claim 10, wherein the entire ESD protection circuit pattern is printed on a backside of one of the first and second outer layers.

12. An ESD protected keyboard comprising:

a plurality of keyboard keys;

a membrane switch structure associated with the plurality of keyboard keys, the membrane switch structure comprising a membrane switch circuit pattern defining a key switch matrix and an ESD protection circuit pattern, wherein at least a portion of the ESD protection circuit pattern, comprising a plurality of circuit lines, has a layout at least generally replicating, and at least generally in registry with, a layout of a plurality of switch circuit lines of at least a portion of the membrane switch circuit pattern.

13. The ESD protected keyboard of claim 12, wherein the ESD circuit pattern at least generally replicates substantially the entire layout of the membrane switch circuit pattern.

14. The ESD protected keyboard of claim 13, wherein separate portions of the switch circuit pattern are printed on respective outer layers of insulating material sandwiching an intermediate layer of insulating material, and wherein at least a portion of the ESD protection circuit pattern is printed on a backside of one of said outer layers of insulating material.

15. The ESD protected keyboard of claim 14, wherein each of said layers of insulating material comprises a polyester sheet.

* * * * *